United States Patent [19]

Beneteau et al.

[11] Patent Number: 4,704,762
[45] Date of Patent: Nov. 10, 1987

[54] WIPER BLADE

[75] Inventors: Christian Beneteau, Gorcy, France; Norbert Guerard, Virton, Belgium

[73] Assignee: Champion Spark Plug Europe S.A., Binche, Belgium

[21] Appl. No.: 892,177

[22] Filed: Aug. 4, 1986

[30] Foreign Application Priority Data

Aug. 29, 1985 [FR] France .................................. 85 12883

[51] Int. Cl.$^4$ ............................................... B60S 1/02
[52] U.S. Cl. .................................................. 15/250.42
[58] Field of Search .......................... 15/250.36–250.42

[56] References Cited

U.S. PATENT DOCUMENTS

| | | |
|---|---|---|
| 2,924,839 | 2/1960 | Anderson . |
| 2,983,945 | 5/1961 | DePew . |
| 3,386,123 | 6/1968 | Oishei et al. . |
| 4,005,503 | 2/1977 | Petrick ............................ 15/250.42 |
| 4,389,747 | 6/1983 | Riester . |

FOREIGN PATENT DOCUMENTS

| | | |
|---|---|---|
| 1505439 | 8/1965 | Fed. Rep. of Germany . |
| 8105384 | 3/1981 | France . |
| 7818526 | 4/1983 | France . |
| 8304993 | 9/1984 | France . |
| 2036547 | 7/1983 | United Kingdom . |

*Primary Examiner*—Peter Feldman
*Attorney, Agent, or Firm*—Wood, Dalton, Phillips, Mason & Rowe

[57] ABSTRACT

A wiper blade has a pressure distributing rod for connection to a superstructure. The rod has two lips directed towards a surface to be wiped and between which a wiping element is placed. The pressure distributing rod is linked to the superstructure of the wiper by a plurality of claws. Deformations on the lips cooperate with at least one claw to confine shifting of the rod relative to the superstructure. Deformations at the ends of the lips retain the wiping element on the pressure distributing rod.

6 Claims, 6 Drawing Figures

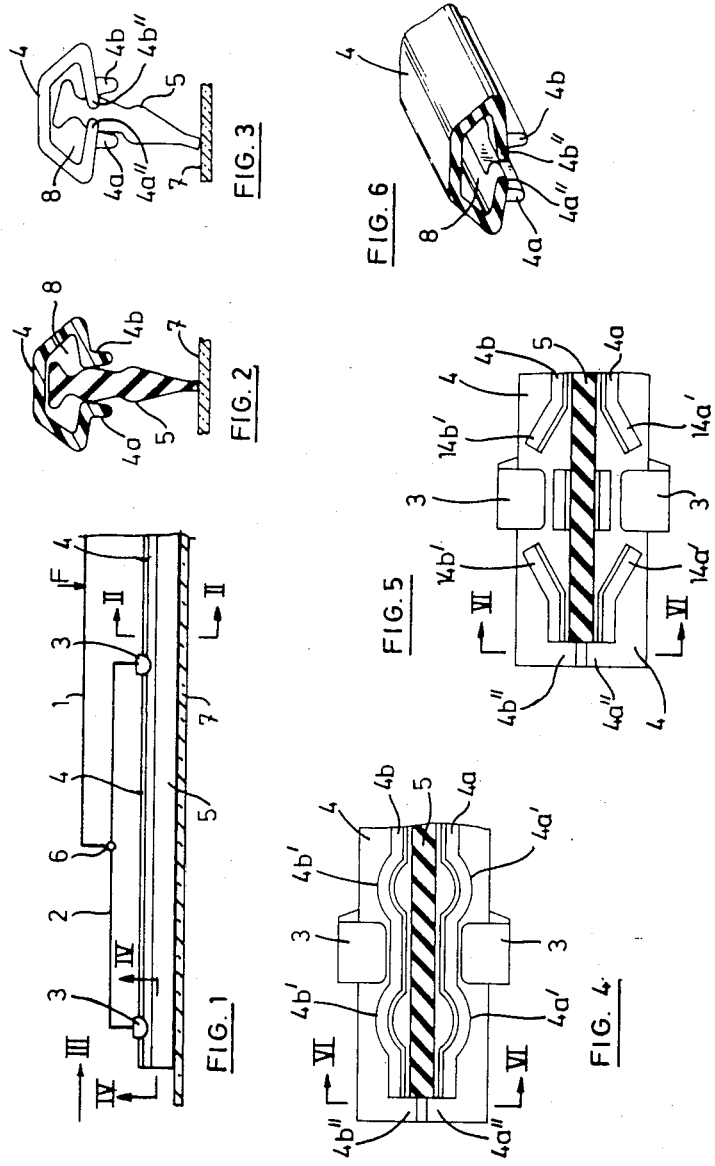

WIPER BLADE

TECHNICAL FIELD

The present invention relates to wiper blade provided with a pressure distributing rod which comprises at its lower portion two longitudinally extending lips directed towards the surface to be wiped and between which extends the wiping element of the wiper blade, the pressure distributing rod being linked to the superstructure of the wiper blade by a plurality of claws which are an integral part of said superstructure.

BACKGROUND ART

To the best knowledge of the applicant no wiper blades of the above defined type are known in the prior art and in particular no pressure distributing rod which comprises at its lower portion two longitudinal lips directed towards the surface to be wiped and between which extends the wiping element of the wiper blade is known.

In the case of pressure distributing rods similar to the one defined above, and in particular in the case of plastic pressure distributing rods, the claws of the superstructure surround the upper portion of the pressure distributing rod which, if no stops are provided, can slide longitudinally in said claws. In the same way the wiping element of the wiper blade can slide longitudinally in a groove provided in the pressure distributing rod if no adequate stops are provided on the pressure distributing rod.

DISCLOSURE OF THE INVENTION

The object of the invention is to provide simple and efficient means, without supplementary elements or parts, for avoiding the longitudinal sliding, at at least one point, of the pressure distributing rod in the claws of the superstructure of the wiper blade and for avoiding the longitudinal sliding of the wiping element in the pressure distributing rod.

To this end the wiper blade according to the invention is substantially characterized (a) by the fact that the pressure distributing rod is retained on the superstructure of the wiper blade by deformations of said longitudinal lips provided on both sides of at least one of the claws of the superstructure and (b) by the fact that the wiping element of the wiper blade is retained in the pressure distributing rod by deformations of said longitudinal lips provided at each of the two extremities of the pressure distributing rod.

It is to be understood that the two above mentioned features (a) and (b) are independent one from the other, i.e. they are not necessarily combined in one single wiper blade.

BRIEF DESCRIPTION OF THE DRAWINGS

Other characteristics of the invention will be better understood when reading the following description of two embodiments of the invention in conjunction with the appended drawings, wherein:

FIG. 1 is a partial and schematic elevational view of a wiper blade according to the invention;

FIG. 2 is an enlarged sectional view along line II—II of FIG. 1 of the assembled pressure distributing rod and wiping element, when the wiper blade is in its rest position;

FIG. 3 is an enlarged elevational view, in the line of arrow III of FIG. 1 of the assembled pressure distributing rod and wiping element; when the wiper blade is working, FIG. 4 is an enlarged sectional view along line IV—IV of FIG. 1 and according to a first embodiment of the invention;

FIG. 5 is an enlarged sectional view along line IV—IV of FIG. 1 and according to a second embodiment of the invention; and FIG. 6 is a perspective sectional view along line VI—VI of FIG. 4 and of FIG. 5, of the pressure distributing rod according to the invention.

BEST MODE FOR CARRYING OUT THE INVENTION

The portion of the wiper blade represented schematically in FIG. 1 comprises the following elements: a main bridge 1 which is linked to a secondary yoke 2 via articulation 6, claws 3 which are an integral part of the secondary yoke 2 and which surround the upper portion of a pressure distributing rod 4 and a wiping element 5 which extends in a longitudinal groove 8 (FIGS. 2, 3 and 6) in the pressure distributing rod 4.

It is to be noted that the elements 1, 6, 2, 3 form the superstructure of the wiper blade of FIG. 1, that said superstructure is only shown as an example, that the wiper blade is symmetrical with respect to the transverse plane passing through the arrow "F" (FIG. 1) and that the wiper arm (not represented) of the wiper blade is attached at "F" to the main bridge 1 of the superstructure.

In FIGS. 2 and 3, which show the assembled pressure distributing rod and wiping element, it can be seen that the upper portion of the pressure distributing rod 4 is provided with a longitudinal groove 8 wherein is located the upper portion of the wiping element 5, and that the lower portion of the pressure distributing rod 4 comprises two longitudinal lips 4a, 4b directed towards a surface to be wiped 7 and between which extends the wiping element 5.

In the first embodiment of the invention, represented in FIG. 4, the pressure distributing rod 4 is retained on the claws 3 of the superstructure 1, 2 of the wiper blade by deformations 4a', 4b' of said longitudinal lips 4a, 4b. The deformations 4a', 4b' have a substantially semi-circular form and there are four such deformations, i.e. one deformation in each of the two longitudinal lips 4a, 4b on both sides of the two legs of the claw 3. It is to be noted that the four deformations 4a', 4b' may be formed in one single operation, by means of an appropriate tool, before the insertion of the wiping element 5 into the pressure distributing rod 4.

In the second embodiment of the invention, represented on FIG. 5, the pressure distributing rod 4 is retained on the claws 3 of the superstructure 1, 2 of the wiper blade by deformations 14a', 14b' in said longitudinal lips 4a, 4b. The deformations 14a', 14b' have substantially the form of short tongues directed towards the claw 3 and there are also four such deformations, i.e. one deformation in each longitudinal lip 4a, 4b on both sides of the two legs of the claw 3. In this case it is quite evident that the lips 4a, 4b must be cut before the tongues 14a', 14b' can be directed respectively towards each of the two legs of the claw 3.

FIGS. 3 through 6 show how the wiping element 5 (not represented in FIG. 6) of the wiping element is retained in the pressure distributing rod 4 by deformations 4a'', 4b'' of said longitudnal lips 4a, 4b provided at each of the two extremities of the pressure distributing rod 4. The deformations 4a'', 4b'' have substantially the form of short tongues directed towards the longitudinal axial plane of the pressure distributing rod 4.

It is further to be noted that the pressure distributing rod according to both embodiments of the invention is preferably made of an appropriate plastic material.

What is claimed is:

1. A wiper blade provided with a pressure distributing rod (4) having a lower portion, said pressure distributing rod (4) comprising at its lower portion two longitudinally extending lips (4a, 4b) directed towards a surface to be wiped (7) and between which extends a wiping element (5) for the wiper blade, the pressure distributing rod (4) being linked to a superstructure (1, 2) of the wiper blade by a plurality of claws (3) which are an integral part of said superstructure (1, 2), each said claw having spaced sides, characterized in that the pressure distributing rod (4) is retained on the superstructure (1, 2) of the wiper blade by deformations (4a', 4b'; 14a', 14b') of said longitudinal lips (4a, 4b) provided on both sides of at least one of the claws (3) of the superstructure (1, 2) of the wiper blade.

2. A wiper blade according to claim 1, characterized in that said deformations of the longitudinal lips (4a, 4b) have a substantially semi-circular form (4a', 4b').

3. A wiper blade according to claim 1, characterized in that said deformation of the longitudinal lips (4a, 4b) have substantially the form of short tongues (14a', 14b') directed towards at least one of the claws (3) of the superstructure (1, 2) of the wiper blade.

4. A wiper blade according to claim 1, characterized in that the wiping element (5) of the wiper blade is retained in the pressure distributing rod (4) by deformations (4a'', 4b'') of said longitudinal lips (4a, 4b) provided at each of two extremities of the pressure distributing rod (4).

5. A wiper blade according to claim 4, characterized in that said deformations of the longitudinal lips (4a, 4b) have substantially the form of short tongues (4a'', 4b'') directed towards the longitudinal axial plane of the pressure distributing rod (4).

6. A wiper blade according to claim 1, characterized in that the pressure distributing rod (4) is made of a plastic material.

* * * * *